Patented July 20, 1937

2,087,585

UNITED STATES PATENT OFFICE 2,087,585

LUBRICATING OIL COMPOSITION

William J. Sweeney and Joshua A. Tilton, Baton Rouge, La., assignors to Standard-I. G. Company, a corporation of Delaware No Drawing. Application September 11, 1934, Serial No. 743,536

9 Claims. (Cl. 87—9)

The present invention relates to improved lubricating compositions, and more specifically to lubricating oils particularly such as motor oils, penetrating oils and the like. The invention will be fully understood from the following description of the method of manufacturing the oils and their composition.

The present composition comprises a blend or mixture of two principal ingredients. One is a lubricating oil which may be of any particular type, for example, it may comprise a fatty oil such as vegetable, animal or fish oil, among which castor oil, rapeseed oil and the like are most desirable; or it may comprise a mineral lubricating oil. The mineral oil may be of any specific type derived from any of the various crude oils by ordinary refining methods, among which may be included acid, alkali and clay treatment, but special methods of refining may likewise be used, such as solvent extraction, hydrogenation or destructive hydrogenation, without departing from the spirit of the present invention. For most purposes the oil should be well refined, but in some instances where cheap compositions are required the oil may be merely distilled to the proper boiling range without further treatment.

The lubricating oil may be made up in any particular grade, depending on the use for which it is intended. Where mineral oils are employed those used may be cut to the proper viscosity range suitable for any of the S. A. E. grades, and for such purposes the ordinary or customary viscosity, flash, carbon and precipitation specifications may be maintained. In the case of fatty oils, these may be thickened by blowing or by electrical condensation so as to produce the viscosity desired.

The second principal ingredient of the present composition is a destructively hydrogenated solvent naphtha of the particular type known as "hydroformed" naphthas. Such materials are prepared according to a known manner, but it may be generally stated that gas oils, kerosene, especially heavily cracked or high naphthenic or aromatic fractions such as solvent extracts of petroleum and the like are subjected to the action of hydrogen gas at temperature in excess of 900 to 950° F. (say 930 to 1050° F.) in vapor phase while under a hydrogen pressure in excess of 20 atmospheres. A total pressure of 200 atmospheres, of which 140 atmospheres may be a hydrogen pressure and the remaining 60 atmospheres a total oil pressure, has been found to be perfectly satisfactory. Catalysts should be used in the hydrogenation, and particularly those of the type which are insensitive to sulphur. Among these the oxides and sulphides of metals of the VI Group of the Periodic Table are of particular importance, and especially mixtures thereof with oxides of the metals of the III and IV Groups, and with zinc oxide, magnesia and the like. The rate of flow may be from say 1.5 to 4 vol. of oil/hr./vol. of catalyst and the amount of hydrogen is ordinarily from 1000 to 4000 cu. ft./bbl. of oil. The conditions to be maintained for producing the hydroformed naphthas and the properties thereof have been completely described in two co-pending applications, Serial Nos. 583,703 and 640,670, filed by R. T. Haslam on December 29, 1931, and November 1, 1932, respectively. In general, however, the properties of different solvent mixtures may be illustrated as follows:

|  | Flash point | Boiling range | Kauri-butanol value |
|---|---|---|---|
| Solvent #1 | 95° F. | 293°–392° F. | 77.5 |
| Solvent #2 | 136° F. | 365°–419° F. | 80.3 |
| Solvent #3 | 200° F. | 419°–550° F. | 88.0 |

These solvents differ materially from the coal tar solvents such as toluol, xylol. The odor is more pleasing and does not cause smarting of the eyes. They are excellent gum and resin vehicles, and compatible with many oxygen containing solvents, especially ethyl alcohol containing considerable quantity of water. These solvents also have a considerably better solvent power for blown oils than the coal tar products. They have excellent wetting or spreading power toward metals, glass and other surfaces and also capillarity to a high degree. These solvents are superior to ordinary naphthas, coal tar products, chlorinated materials in these respects.

The particular cut or distillation range of the naphtha may be chosen in view of the use to which the finished oil is to be put. Where relatively high flash point is desired, as in the case of motor oils, it is desirable to use a higher boiling close cut solvent naphtha such as is illustrated above. Where flash point is of little or no significance it is preferred to use a lower boiling range.

The amount of the solvent naphtha may be adjusted to secure any particular properties, but in general the amount ranges from say .1 to 50% or more. For example, in motor oils it is generally desirable to use a close cut high boiling naphtha fraction, say with a boiling range of 400 to 450° F., as stated above, and the amount is generally relatively small, say for example between 1 or 2% to 10 or 15%. In addition to the predilution effect which is, of course, obtained, it is found that the oil has extremely low tendency to produce gummy, carbonaceous deposits in an automotive engine. It is believed that the reason for this lies in the high solvent power exerted by the hydrosolvent naphtha on the oxidation products which are responsible for such engine deposits. The hydroformed naphtha is very stable itself and little given to decomposition. It is likewise found that such solvents have good anti-detonation qualities so that if a small portion of it is evaporated in the engine it will not decrease the anti-knock value of the fuel used. These naphthas have a considerable anti-oxidizing power and may serve to replace or supplement oxidation inhibitors in the lubricating oil.

For use in penetrating oils, especially such as may be used for the lubrication of automobile springs and for similar purposes, it is desirable to use a lower boiling solvent, and a boiling range from 300 to 400° F. has been found satisfactory. The amount used ordinarily varies from 25 to 50% or more of the composition. The solvent naphtha gives to the blend a greatly increased penetrating power so that lubricating oil is brought to every part of the surfaces to be treated. It is also found that the solvent rapidly evaporates after carrying the lubricant to the desired point leaving the lubricating oil in place.

Besides the principal ingredients, it will be understood that other ingredients may be included in the present composition. Emulsifying compounds such as oil-soluble soaps, sulphonates and sulphated alcohols may be used for this purpose. The addition of solvent naphtha greatly increases the emulsifying power of these compounds and the penetrating qualities of the oil. Such compositions have been found to be excellent textile oils, especially for lubricating wool and cotton fibers, and artificial silk during the various carding and spinning processes, in that they have a high lubricating quality and are capable of being removed with the greatest ease.

If desired, soaps and other ingredients such as olefin polymers, polymers of hydroxy acids and the like may be added so as to substantially thicken the lubricant, even to the extent of causing it to solidify, and solid lubricants such as graphite and talc may be added where desired. Dyes, pour inhibitors, oiliness agents and the like may be added in the case of the present composition, just as they are used in the ordinary oils.

The following examples illustrate the composition and properties of the present composition:

Example I

A hydroformed naphtha is prepared by the destructive hydrogenation of a liquid sulphur dioxide extract obtained from kerosene. The material was treated with hydrogen at temperatures in excess of 950° F., condensed and separated into cuts suitable for the present purposes. A lubricating oil was caused to sludge by blowing with air and the total sludge was collected. The solubility of the sludge was then determined in various solvents included in the table below:

| | Per cent |
|---|---|
| Hydrogenated solvent naphtha (B. P. 419–460° F.) | 50.5 |
| Benzol | 18.3 |
| Toluol | 17.4 |
| Petroleum naphtha | 2.3 |

The percentage given in the above table represents the amount of the petroleum sludge by weight which could be dissolved under comparable conditions in the solvent designated.

Motor oils of various S. A. E. grades from 10 to 50 were made up with from .1 to 15% of the solvent naphtha prepared above. These blends had substantially greater solvent power for sludges than the blends containing equal amounts of benzol or toluol. Automotive engines ran smoothly on the blends showing less carbon formation and less oxidation than is ordinarily encountered.

Example II

A hydroformed naphtha cut (365 to 419° F.) was prepared according to the method shown in Example I. One gram of this substance was placed in the center of a 7 centimeter watch glass. The spreading or creeping power of the solvent could be readily observed and within a short time it had "wetted" the entire surface of the watch glass. Similar tests made with benzol, toluol, xylol, carbon tetrachloride, ethyl alcohol, and with ordinary naphtha showed that none of these substances possessed the wetting or creeping power to a comparable degree.

The capillarity of the hydro solvent naphtha was compared with that of carbon tetrachloride, the former showed a rise of 46 mm. against 24 mm. for the latter at 90° F.

To directly compare the power of the hydroformed naphtha blends with carbon tetrachloride blends, mixtures were made up with equal parts of the same mineral lubricating oil; and in the one case with the hydrogenated solvent naphtha and in the other with carbon tetrachloride. One drop of each of these blends was applied to a clean steel surface from the same dropper and the wetted area was measured in each case. With the hydroformed naphtha blend this area was 7.5 square centimeters, while with the carbon tetrachloride blend it was only 3.5 square centimeters.

The present invention is not to be limited by any theory of the action of the principal ingredients, nor to any specific substances or preparations thereof, but only to the following claims in which it is desired to claim all novelty inherent in the invention.

We claim:

1. Composition of matter suitable for lubricating internal combustion engines, containing a lubricating oil and a "hydroformed" naphtha boiling between 293° and 550° F.

2. Composition of matter suitable for lubricating internal combustion engines, containing a lubricating oil and a hydroformed naphtha boiling between 293° and 550° F. prepared by the destructive hydrogenation of a carbonaceous material of higher molecular weight at a temperature in excess of 900° F.

3. Composition according to claim 2 in which the lubricating oil is one of the group consisting of animal, vegetable, marine and mineral oils.

4. Composition according to claim 2 in which the lubricating oil is selected from the class of fatty oils.

5. Composition of matter suitable for lubricating internal combustion engines, containing a mineral lubricating oil and a hydroformed naphtha boiling between 293° and 550° F. prepared by the destructive hydrogenation of a carbonaceous material of higher molecular weight at a temperature above 900° F.

6. Composition according to claim 5 in which the hydroformed naphtha is derived from a petroleum fraction.

7. Composition according to claim 5 in which the naphtha is derived from a solvent extract of petroleum.

8. Composition of matter suitable for lubricating internal combustion engines, containing a mineral lubricating oil diluted with from 1 to 15% of a naphtha boiling between the limits of about 400 and 500° F. and prepared by the destructive hydrogenation of a petroleum extract at a temperature in excess of 900° F.

9. Composition of matter comprising a mineral lubricating oil diluted with 25 to 75% of a hydroformed solvent naptha having a boiling range from about 350 to 400° F. and prepared by the destructive hydrogenation of a petroleum extract at a temperature above 900° F.

WILLIAM J. SWEENEY.
JOSHUA A. TILTON.